United States Patent
Fahr

[11] Patent Number: 6,129,488
[45] Date of Patent: *Oct. 10, 2000

[54] PIPE-CUTTING AND CHAMFERING ARRANGEMENT

[75] Inventor: Markus Fahr, Gottmadingen, Germany

[73] Assignee: Georg Fischer Rohrverbindungstechnik, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/930,359

[22] PCT Filed: Jan. 28, 1997

[86] PCT No.: PCT/CH97/00024

§ 371 Date: Feb. 2, 1998

§ 102(e) Date: Feb. 2, 1998

[87] PCT Pub. No.: WO97/27969

PCT Pub. Date: Aug. 7, 1997

[30] Foreign Application Priority Data

Jan. 31, 1996 [DE] Germany ............................ 196 03 361

[51] Int. Cl.[7] ............................ B23D 45/12; B26D 11/00
[52] U.S. Cl. ............................ 407/31; 83/54; 30/97
[58] Field of Search ............................ 83/862, 863, 869, 83/54; 407/31; 30/96, 97, 101; 82/113, 702, 78, 101

[56] References Cited

U.S. PATENT DOCUMENTS

| | | | |
|---|---|---|---|
| 2,411,784 | 11/1946 | Goldsmith | 407/31 |
| 3,088,352 | 5/1963 | Tanner | 30/97 X |
| 3,431,646 | 3/1969 | Young | 30/97 |
| 3,839,791 | 10/1974 | Feamster, III | 30/97 |
| 3,974,562 | 8/1976 | Wuchner | 30/97 |
| 4,171,926 | 10/1979 | Dusza | 407/31 X |
| 4,490,909 | 1/1985 | Wachs et al. | 30/97 |
| 4,625,464 | 12/1986 | Kubo | 82/113 X |
| 4,641,562 | 2/1987 | Clarke | 83/837 |
| 5,349,751 | 9/1994 | Fahr | 30/101 X |

FOREIGN PATENT DOCUMENTS

| | | | |
|---|---|---|---|
| 3143697 | 5/1983 | Germany | 83/869 |

*Primary Examiner*—Rinaldi I. Rada
*Assistant Examiner*—Charles Goodman
*Attorney, Agent, or Firm*—Gifford, Krass, Groh, Sprinkle, Anderson & Citkowski, P.C.

[57] ABSTRACT

The invention pertains to a device for cutting and chamfering thin-walled pipes. In order to cut and chamfer a pipe, a drive unit with tools arranged on its shaft is manually guided around a pipe that is clamped in a vise by means of clamping jaws with a semicircular contact surface. The tools, namely a saw blade and a milling cutter, are arranged one behind the other on the shaft. The saw blade is provided with a depression, into which the milling cutter is inserted such that the outer edge of the milling cutter is protected.

8 Claims, 5 Drawing Sheets

PIPE-CUTTING AND CHAMFERING ARRANGEMENT

FIELD OF THE INVENTION

The invention pertains to a device for cutting and chamfering pipes.

BACKGROUND

A device for cutting pipes is known from CH 568,117. In this case, a driving motor with a saw blade is advanced by means of an eccentric arrangement of different rings. Subsequently, the driving motor with the saw blade is manually guided around the pipe such that said pipe is cut. The pipe is centered and held in a vise by means of two V-shaped clamping jaws.

When welding a pipe to another pipe by means of an automated orbital welding process, an exact and uniform chamfer must be produced on both pipe ends. Otherwise, the welding process cannot be carried out correctly. This means that the pipe must be chamfered in one additional processing step after it has been cut.

For this purpose, the aforementioned device is equipped with an auxiliary milling cutter. This auxiliary milling cutter is arranged directly adjacent to the saw blade. The driving motor with the saw blade and the auxiliary milling cutter is guided around the stationary pipe once such that the pipe is simultaneously cut and chamfered.

One disadvantage of this device is that an exact chamfer cannot be produced in thin-walled pipes with large diameters because the clamping jaws of the pipe receptacle only accommodate the pipe in pointwise fashion. This means that the thin-walled pipe is clamped in the vise off-center during the clamping process.

Another problem of the aforementioned device is that the auxiliary milling cutter is very susceptible to wear on its front edge, i.e., the outer edge of the auxiliary milling cutter.

The pipe end also must be chamfered if a press fitting with a rubber ring seal is attached. These press fittings are used for connecting two thin-walled pipes of special steel in drinking water installations. In this case, two different chamfers are produced on the pipe ends, i.e., a steep chamfer for attaching and centering the press fitting onto the pipe and a flat chamfer.

SUMMARY OF THE INVENTION

The invention is based on the objective of developing a device for cutting and chamfering pipes which makes it possible to cut and exactly chamfer thin-walled pipes.

The advantage of the invention is that thin-walled pipes can be pressed into a round shape, cut and correspondingly chamfered in one processing step.

Due to the special design of the saw blade, the milling cutter has a significantly longer service life.

BRIEF DESCRIPTION OF THE DRAWINGS

The invention is described in detail below with reference to the Figures. Shown are.

DETAILED DESCRIPTION OF THE PREFERRED EMBODIMENTS

The Figures show a device for cutting and chamfering pipes. This device consists of a clamping device 1 and a machine tool unit 2.

Figure 1:
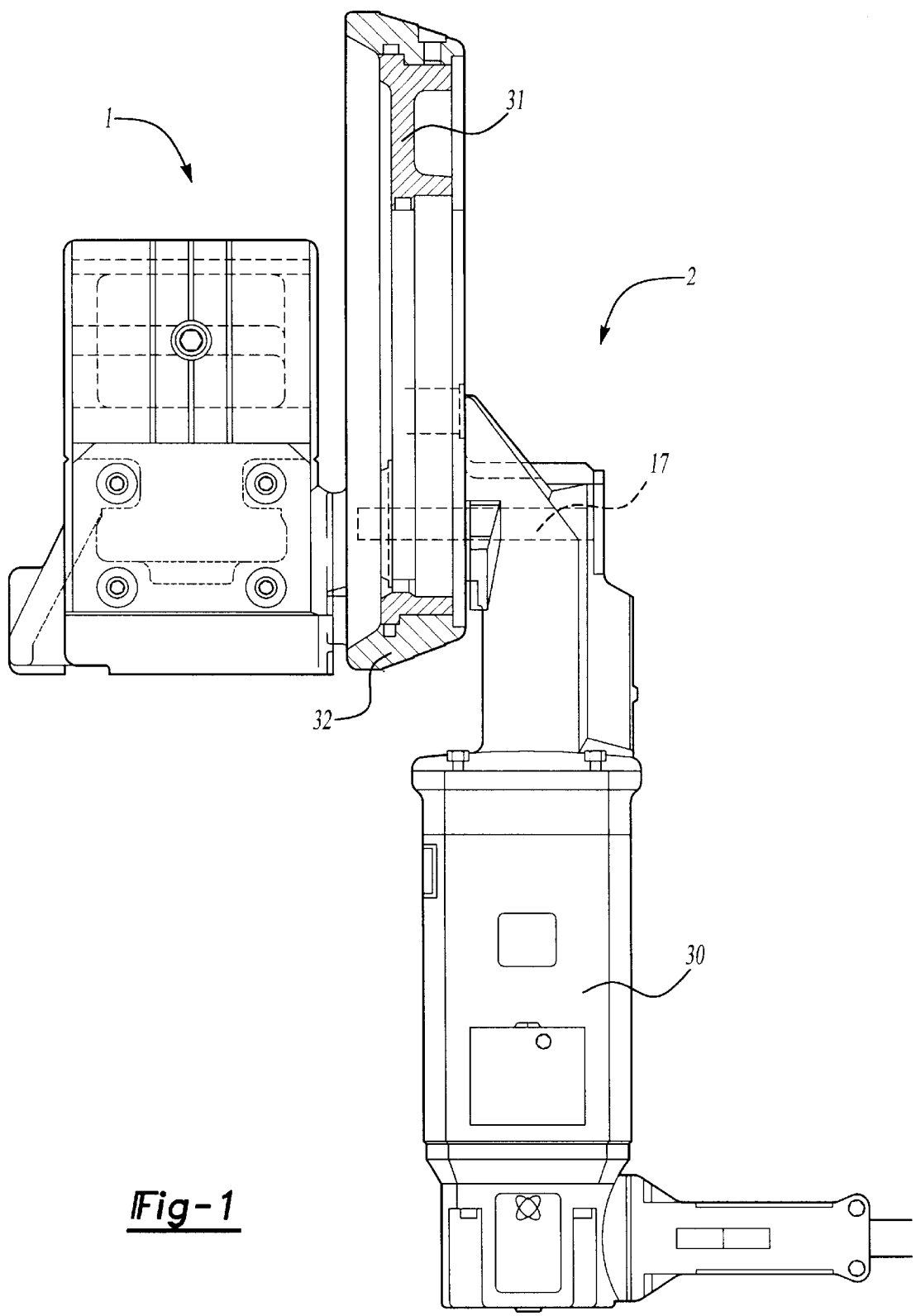
FIG. 1, a side view of a device for cutting and chamfering pipes according to the invention with a clamping device and a machine tool unit.
Figure 2B:
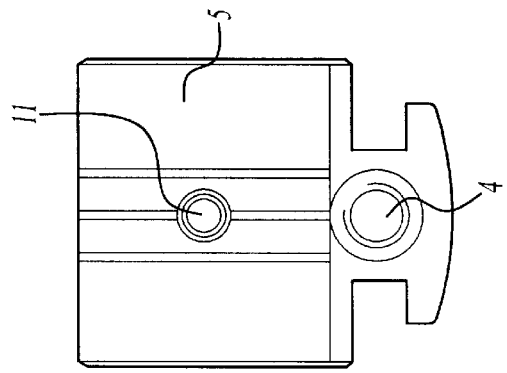
FIG. 2b is a view of a clamping jaw.
Figure 2A:
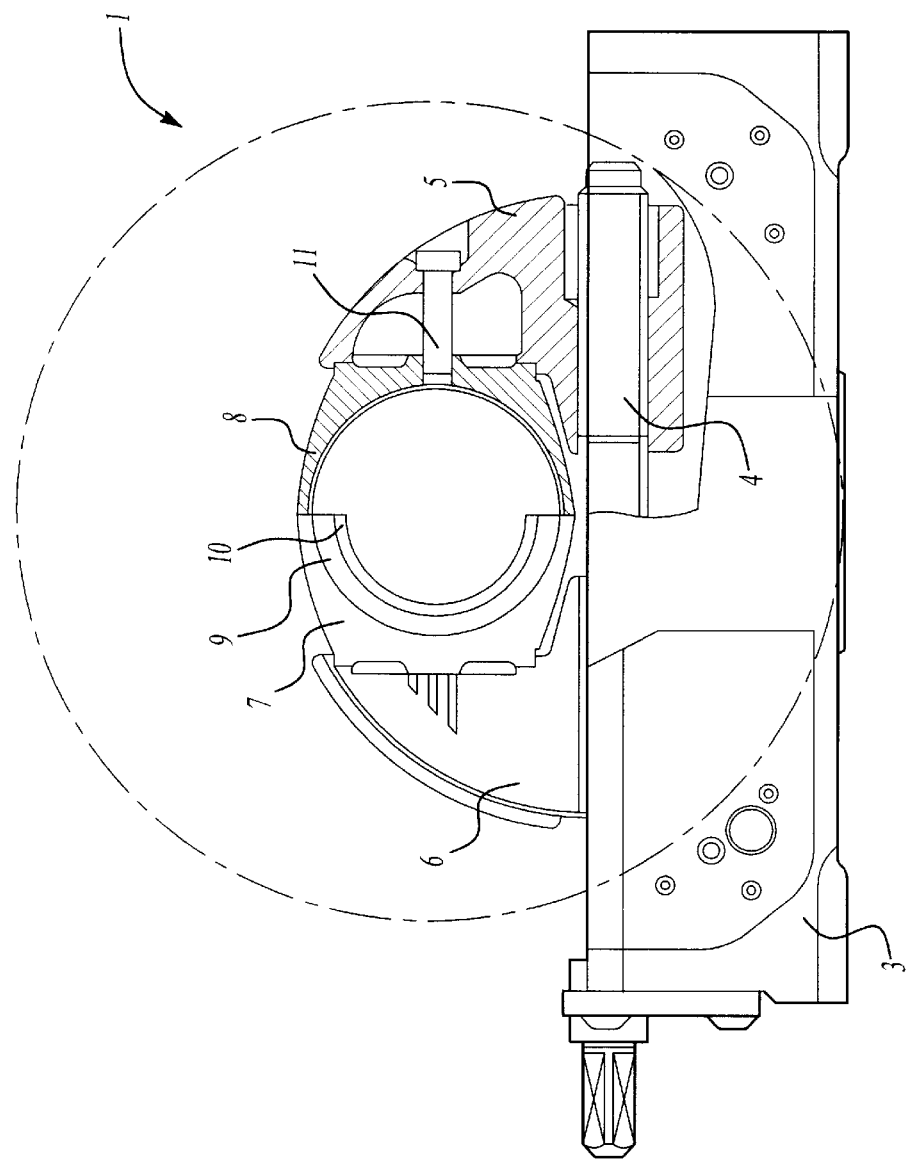
FIG. 2a, a top view of the partially sectioned clamping device.

FIGS. 2a and 2b show that the clamping device 1 consists of a vise 3. The holders 5 and 6 for the clamping jaws can be displaced relative to one another by means of a spindle 4. Clamping jaws 7 and 8 are rigidly connected to the respective clamping jaw holders 5 and 6. The clamping jaws have a semicircular inner surface 9 that adjoins the outer surface of a pipe 10 during the clamping process. When clamping a thin-walled pipe, oval sections of the pipe are compensated for by the clamping jaws.

When processing pipes of different diameters, the clamping jaws must be replaced with other clamping jaws with a semicircular inner surface that corresponds to the outer surface of the respective pipe. This replacement is realized by loosening the screws 11 that serve for fixing the clamping jaws to the clamping jaw holders. In addition, other solutions may be considered for attaching the clamping jaws, e.g., the utilization of a quick-action clamping system with a toggle lever arrangement.

A nonhardened material, in this case GGG 40, is used as the material for the clamping jaws 7 and 8. The semicircular inner surface of the clamping jaws is produced by mechanical processing so as to attain an exact inner contour with very small tolerances.

Figure 3:
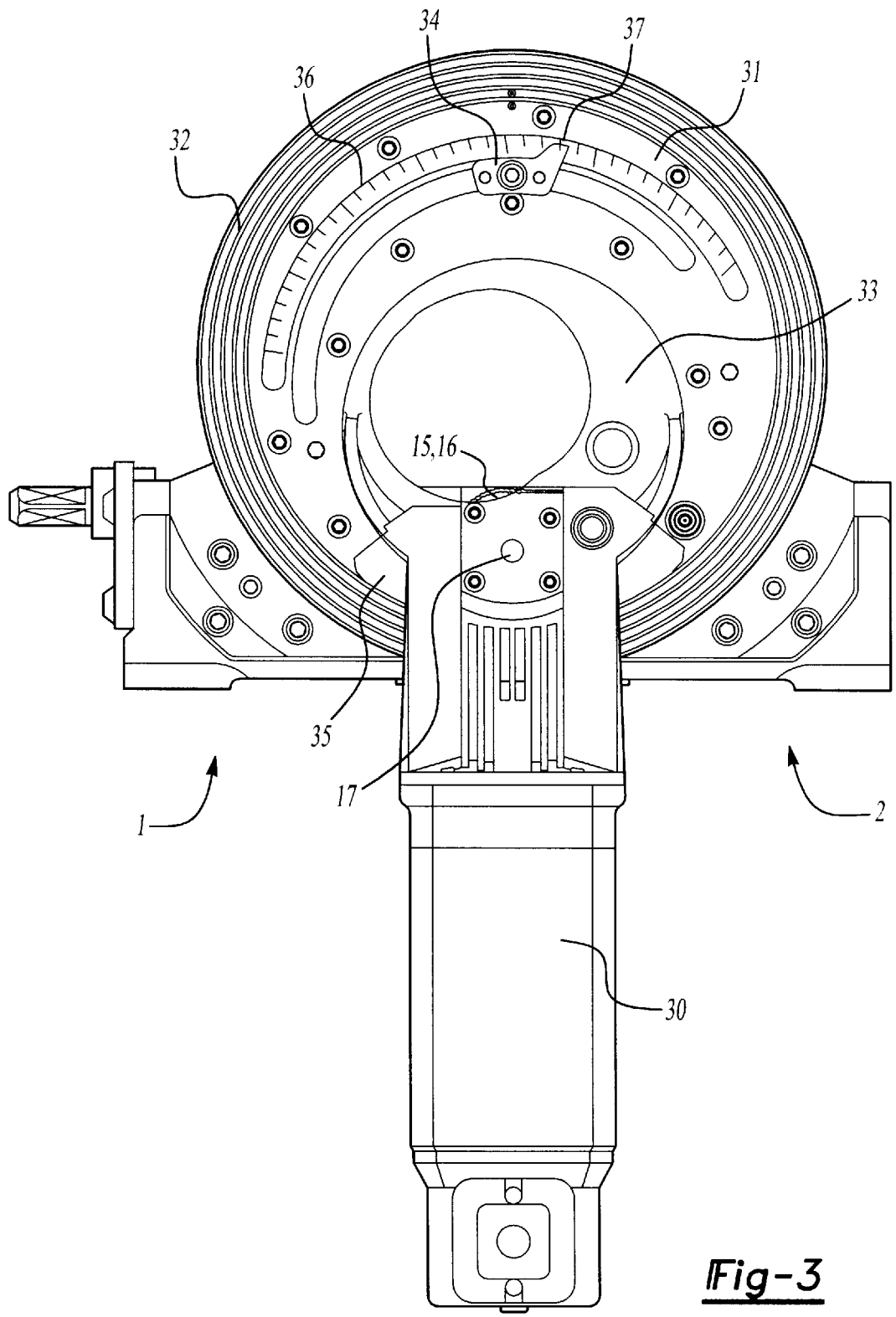
FIG. 3, a top view of the machine tool unit.

FIG. 3 shows the function of the device for cutting and chamfering pipes. The machine tool unit 2 comprises a drive unit 30. The tools 15 and 16 for processing the pipes are arranged on the shaft 17 of the drive unit.

The drive unit 30 is fastened on an eccentric ring 33. The eccentric ring 33 is rotatably arranged on the inner surface of a guide ring 31. The outer surface of the guide ring 31 is rotatably arranged on an annular guide housing 32. The center of motion of this bearing arrangement is identical to the center of the pipe. The drive unit is advanced via the eccentric ring 33. The depth of advance is limited by means of an adjustable limit stop 34 on the guide ring and a driver pin 35 of the eccentric ring 33. After the eccentric advance is carried out, the drive unit with the tools is manually guided around the pipe once concentric to the pipe center.

The aforementioned advance may also be realized in the form of a linear advance, e.g., with the aid of a spindle and a corresponding cradle guide.

An exact advance is essential for all embodiments because the tolerances of the chamfers are usually very small in thin-walled pipes. Consequently, it is advantageous to arrange an exact graduated scale 36 on the guide ring so as to allow a precise adjustment of conventional pipe dimensions. A marking 37 that cooperates with the graduate scale 36 is arranged on the adjustable limit stop 34. The marking 37 may be realized in the form of a vernier. In addition, visual aids may be used for attaining a more precise adjustment.

Figure 4:
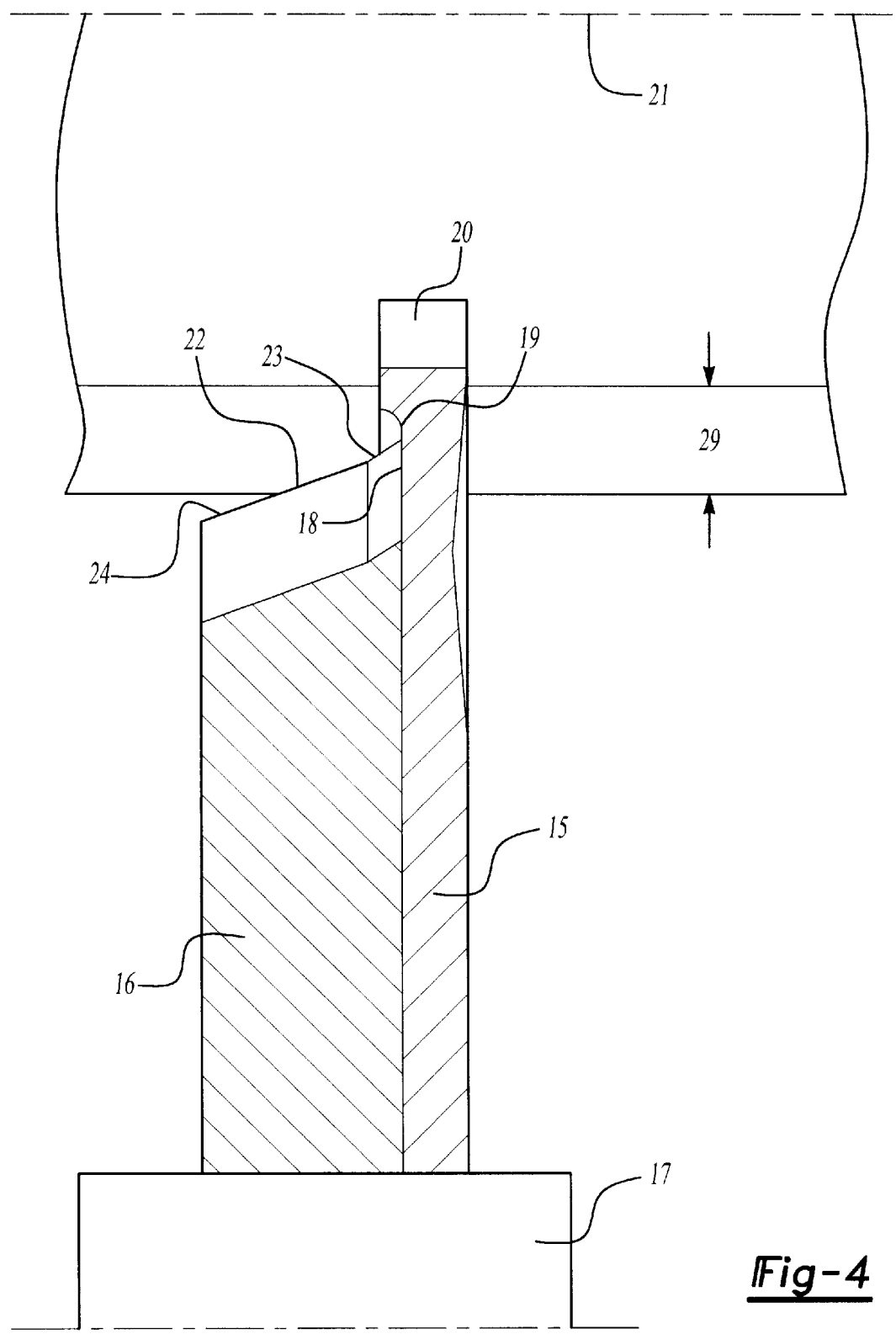
FIG. 4, an enlarged representation of the tools shown in FIG. 1.
Figure 5:
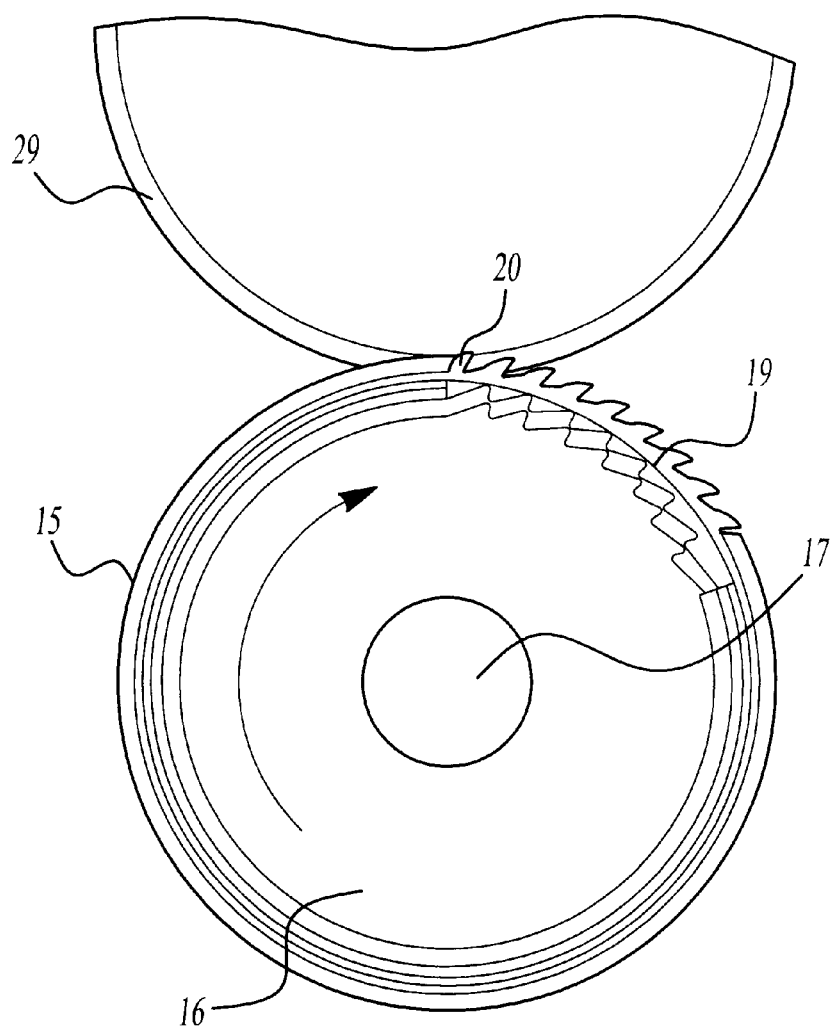
FIG. 5, a top view of FIG. 4.

FIGS. 4 and 5 show the arrangement of a saw blade 15 and a milling cutter 16 on the shaft 17 of the drive unit 30. The saw blade 15 has an axial depression 18 of larger diameter than the outer diameter of the milling cutter 16. The milling cutter 16 is inserted into this depression 18. The outer edge 19 of the milling cutter is covered by the saw teeth 20. This region is not engaged during the machining process. Consequently, the milling cutter is subjected to less wear. Even the smallest chips can no longer penetrate between the contact surfaces of the milling cutter and the saw blade and spread apart both tools. Until now, this spreading apart of the tools frequently resulted in their destruction.

The milling cutter 16 is realized in the form of a chamfering cutter. Certain chamfering cutters can be used depending on the respective requirements. When attaching press fittings, it is advantageous to arrange two different chamfers on the pipe ends. This requires a chamfering cutter that can produce two chamfers. This is attained due to the geometric design of the milling cutter 16. FIG. 4 shows that the cutting edge 22 of the milling cutter comprises an initial bevel 23 of approximately 45° and a subsequent bevel 24 of approximately 5°–20° relative to the longitudinal axis 21 of the pipe. The milling cutter may have any arbitrary geometry, but the outer edge of the milling cutter is always protected by the depression 18 in the saw blade.

FIG. 5 shows that the milling cutter 16 has only an insignificantly smaller diameter than the saw blade 15. In this embodiment, the radius is smaller by approximately the depth of advance of the saw blade. The depth of advance of the saw blade is approximately 1.5-times the wall thickness 29 of the pipe. In contrast to thick-walled pipes, the saw blade is engaged slightly behind the inner pipe wall when cutting thin-walled pipes. Consequently, more saw teeth 20 are engaged and rattling is prevented. Subsequently, the milling cutter must immediately engage because the saw blade would otherwise protrude excessively far into the pipe.

What is claimed is:

1. A device for cutting and chamfering a pipe comprising:

a drive unit having a shaft;

a processing tool arranged on the shaft, the processing tool comprising a cutting tool and a chamfering tool arranged one behind the other, the chamfering tool having an outer diameter, the cutting tool having an axial depression defined therein, the axial depression having a diameter greater than the outer diameter of the chamfering tool and the chamfering tool being arranged in the depression; and a clamping device with clamping jaws for accommodating the pipe, each of the clamping jaws having a partially circular cross section;

wherein the drive unit and the processing tool are concentrically guided around the pipe that is clamped in the clamping device.

2. Device for cutting and chamfering a pipe according to claim 1, wherein the clamping jaws are detachable from the clamping device for replacement.

3. Device for cutting and chamfering a pipe according to claim 1, wherein the clamping jaws are manufactured of a nonhardened material.

4. Device for cutting and chamfering a pipe according to claim 1, wherein the partially circular cross section of the clamping jaws has an inscribed angle between 160° and 180°.

5. A device for cutting and chamfering a pipe comprising:

a drive unit having a shaft;

a processing tool arranged on the shaft, the processing tool comprising a cutting tool and a chamfering tool arranged one behind the other, the chamfering tool having an outer edge and an outer diameter, the cutting tool having an axial depression defined therein, the chamfering tool being arranged in said axial depression, the axial depression having a diameter greater than the outer diameter of the chamfering tool, the cutting tool further having teeth that cover the outer edge of the chamfering tool so that during chamfering, the outer edge of the chamfering tool is not used; and a clamping device with clamping jaws for accommodating the pipe, each of the clamping jaws having a partially circular cross section;

wherein the drive unit and the processing tool are concentrically guided around the pipe that is clamped in the clamping device.

6. Device for cutting and chamfering a pipe according to claim 5, wherein the clamping jaws are detachable from the clamping device for replacement.

7. Device for cutting and chamfering a pipe according to claim 5, wherein the clamping jaws are manufactured of a nonhardened material.

8. Device for cutting and chamfering a pipe according to claim 5, wherein the partially circular cross section of the clamping jaws has an inscribed angle between 160° and 180°.

* * * * *